PRIVATE BRANCH EXCHANGE SYSTEM HAVING DATA TRANSMISSION LINES AND MEANS FOR PREVENTING APPLICATION OF TONES THERETO

Filed Dec. 3, 1965

INVENTOR
E. H. ALBRECHT
BY
J. R. McCorkendale
ATTORNEY

United States Patent Office 3,435,150

Patented Mar. 25, 1969

3,435,150

PRIVATE BRANCH EXCHANGE SYSTEM HAVING DATA TRANSMISSION LINES AND MEANS FOR PREVENTING APPLICATION OF TONES THERETO

Erwin H. Albrecht, Brick Township, Ocean County, N.J., assignor to Bell Telephone Laboratories, Incorporated, New York, N.Y., a corporation of New York Filed Dec. 3, 1965, Ser. No. 511,508

Int. Cl. H04m 3/60

U.S. Cl. 179—27 11 Claims

ABSTRACT OF THE DISCLOSURE

In a PBX having lines which are used for data transmission, the camp-on and butt-in facilities of the PBX apply camp-on and butt-in indicating tones to the lines. In the case of data lines the tones would tend to decrease the quality of the data transmission. Solid state circuitry which is easily attachable to PBX circuitry is used to prevent the application of camp-on and butt-in tones to the lines of the PBX that are of the data transmission class.

Figures 1, 2:
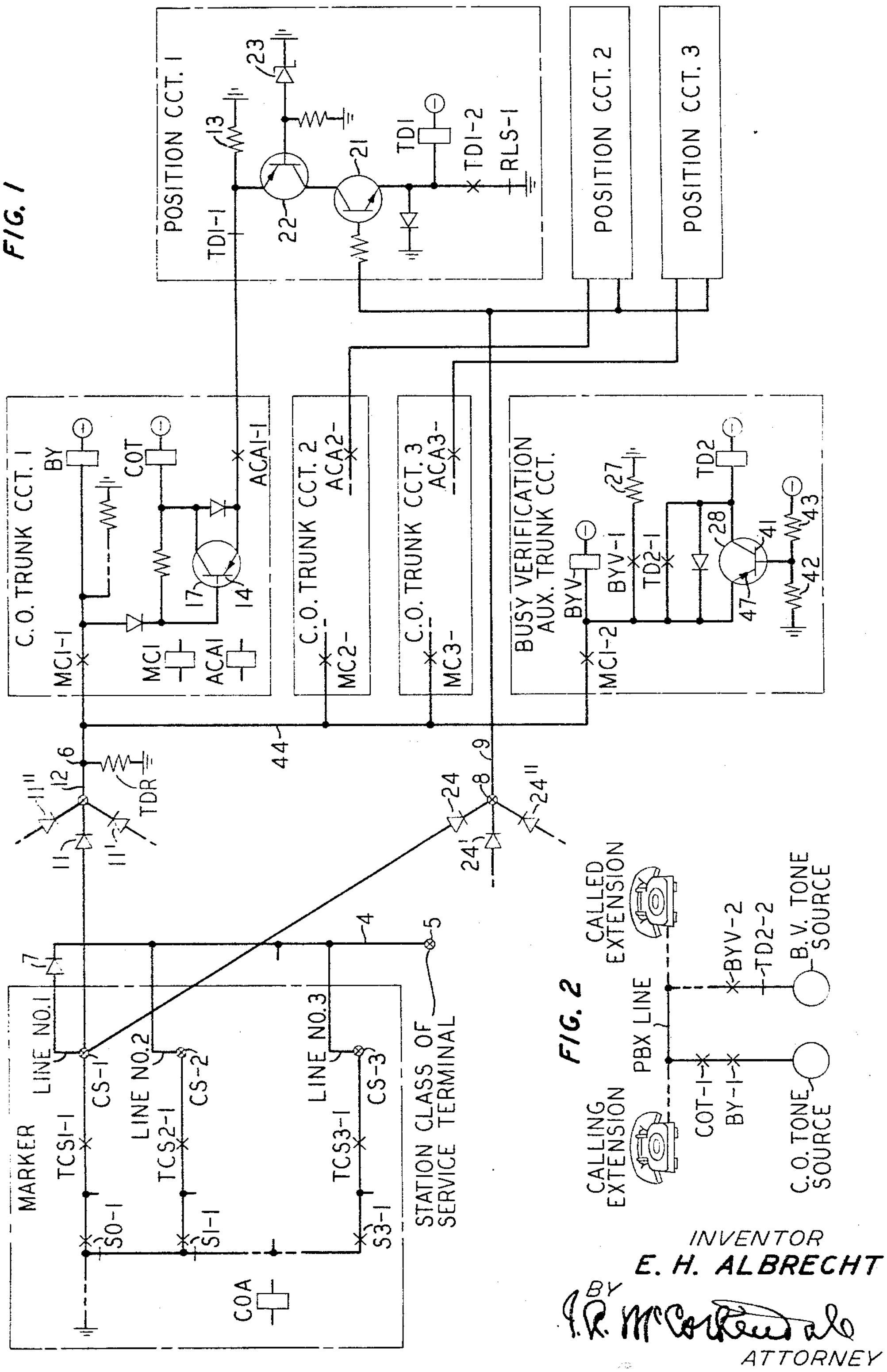

This invention relates to a private branch exchange telephone system and more particularly to a private branch exchange telephone system which includes data set lines.

In instances where a telephone customer, for example a business firm, a Government agency, or the like, requires a relatively large number of extensions, it is the usual practice to provide on the premises, or conveniently located thereto, a private branch exchange commonly referred to as a PBX. The larger PBX's are usually served by one or more attendants from a console or attendant's position and function essentially as a small telephone central office in that intrastation calls between extensions on the premises are completed through the PBX, as well as calls from the extensions to subscribers served through remote central offices and calls from such subscribers to extensions served by the PBX. An automatic private branch exchange of the type capable of serving a relatively large number of extensions and providing many advanced features is disclosed in Patent 2,904,637, issued Sept. 15, 1959 to R. D. Williams.

In order to improve and broaden the services provided by the PBX various so-called auxiliary facilities have been incorporated. For example, as disclosed in the Williams patent mentioned above, camp-on service is commonly provided whereby, when a connection is attempted to a called line and the called line is found to be busy, the partially completed connection is held until the called line becomes free whereupon the connection is completed and the called party signaled.

A more advanced type of camp-on service, which has recently been provided and which is commonly referred to as "executive camp-on and ringback," is disclosed in the copending application of L. E. Thelemaque, Ser. No. 385,973, filed July 29, 1964, now Patent No. 3,355,555, issued Nov. 28, 1967. In accordance with this arrangement the originating caller, for example an executive of the firm, after having established a camp-on relationship with the busy called extension, may go on-hook and as soon as the called extension terminates the first call and goes on-hook both the originating calling extension and the called extension are rung.

Still another auxiliary service recently provided in PBX's of the general type disclosed in the Williams patent referred to is that of busy vertification; an arrangement for providing this service is disclosed in the copending application of G. A. Michalopoulos and L. E. Thelemaque, Ser. No. 363,138, filed Apr. 28, 1964, now Patent No. 3,327,065, issued June 20, 1967. In accordance with this arrangement the PBX attendant is enabled to establish a connection to an apparently busy extension whereby to determine, when desirable, whether the extension is actually in "talking" condition or whether the busy indication has resulted from some trouble condition.

When services of the above nature are activated a warning or alerting tone is commonly applied to the involved line or lines. Thus, when camp-on is effected, a "camp-on tone" is applied to the line whereby to inform the calling party that a camp-on connection has been established to the busy called line. Similarly, in the case of executive camp-on and ringback service a tone is supplied both to the busy called extension and to the calling extension, in the first instance to warn the busy party that an executive call is awaiting his attention and, in the second instance, to advise the calling party that he may go on-hook and will be rung back when the called party goes on-hook. Also, when a busy vertification connection has been effected, a tone is applied to the line as a warning to the busy subscriber that the attendant has cut in on the line.

Telephone networks are now being used in constantly increasing numbers for providing so-called data services. An ordinary telephone call serves to set up the connection whereupon, through the medium of appropriate DATA-PHONE data sets provided by the telephone companies, many kinds of business machines provided by the customers can communicate through the network. Accordingly, it is now the usual practice in PBX management to assign a certain number of arbitrarily selected lines to data service, that is the selected lines are assigned a data class of service.

While the warning or alerting tones referred to above serve an important, indeed an essential function in connection with their intended purpose, they have at the same time presented a vexing problem since it has been found that when applied to a busy line which is being used for data transmission they can, and usually do, cause the receiving data equipment momentarily to fail. Various alleviating methods thus so far proposed have proven unsatisfactory; these previously proposed methods have included limiting the application of the alerting tones to busy data set lines to the periods when the data set is not receiving or transmitting data as well as the use of wave filters to prevent the tones from being applied to the data set lines at all times.

Accordingly, it is an object of my invention to improve the performance of private branch exchanges where selected lines are used for data service.

A more specific object of the invention is to prevent impairment of data set operation by normal PBX supervisory tones.

An additional specific object of the invention is to prevent the application of special alerting or warning tones to data set lines by the PBX control circuits.

In accordance with a specific embodiment of the invention the originating class-of-service terminals for each line in the marker of the PBX are utilized in a novel manner whereby to so mark the terminals of those lines assigned to data service that the alerting tones referred to are not applied thereto. The class-of-service terminals referred to, in connection with their normal marker function, provide a connection to direct ground through make contacts of certain relays which are operated during the short interval while the marker locates a line to determine the dialing restrictions which are to be associated with calls originated by the particular line. In the instances only of each of the lines assigned to data transmission, that is lines given a data class of service, a connection through a diode is provided to the respective class-of-service terminal. A transistor OFF-ON switch is provided in the operate path of the tone applying relay and the difference in bias, i.e. to resistance ground in the instance of a nondata line and to direct ground in the instance of a data line, determines whether or not the tone is applied to the involved line.

A feature of the invention is utilization of a path to direct ground normally provided at the class-of-service terminal of a line for preventing the application of an alerting or warning tone to the line under a first switching condition.

A further feature of the invention is utilization of the same path to direct ground for preventing application of a second tone to the line under a different switching condition.

A full understanding of the arrangement contemplated by the present invention as well as an appreciation of the various advantageous features thereof may be gained from consideration of the following detailed description in connection with the accompanying drawing, in which:

FIG. 1 shows schematically portions of a PBX circuit including tone controlling arrangements in accordance with one specific illustrative embodiment of the invention; and FIG. 2 shows schematically the manner in which certain alerting or warning tones are applied to a busy line.

Referring to the drawing and first to FIG. 1, portions of a crossbar PBX are shown in highly schematic form; it will be assumed for purposes of simplified disclosure that the PBX follows the general arrangement described in detail in the R. D. Williams Patent 2,904,637 referred to above. The circuit arrangements contemplated by the present invention are particularly adapted for use in conjunction with the basic switching and controlling circuits fully described in the Williams patent and such circuits will be described herein only to the extent necessary for full understanding of the present invention. The inventive arrangement is particularly attractive for use in a commercial installation of this type since only three simple diode connections are required for rendering the tone preventing means effective with regard to selected data lines; normal voice line arrangement and operation are in nowise affected as will be apparent from the description immediately below.

*Normal operation—voice line*

The simple and effective application of the invention in connection with data lines as subsequently described will be more readily apparent if the normal operation of nondata or voice lines first be considered briefly. In this instance the alerting or warning tones should of course be applied to the busy line in the normal manner as mentioned above; as an illustrative example the application of camp-on tone will first be described.

It will be assumed now for purposes of further decription that C.O. trunk circuit No. 1 has been connected to a PBX line for completion of an incoming call and, further, that the called extension has been found in busy condition and that a camp-on connection to the busy called extension has been established in the general manner described in the Williams Patent 2,904,637 referred to above. Since the various operations involved are fully described in the Williams patent they will not be described in detail herein. However, in order that the operation of the present invention be properly described certain of the basic relays of the PBX and their operation will be briefly referred to.

First, it might be pointed out, as described in the Williams patent, that each line is provided with an individual class-of-service terminal, as CS–1 of line No. 1; CS–2 of line No. 2; CS–3 of line No. 3; and that these individual terminals are connected as by lead 4 to station class-of-service terminal 5.

Associated with the marker are a group of Sleeve Test relays S0–S3 (one per line) and a group of Tens Class relays TCS1–TCS3 (also one per line), and it will be noted that when the particular pair of relays associated with a particular line are operated, a path is provided from the individual class-of-service terminal of the line to direct ground. For example with relays TCS1 and S0 operated a path from terminal CS–1 to direct ground is closed through make contacts TCS1–1 and S0–1. The Sleeve Test and Tens Class relays operate during the normal marker operations involved in selection of the called extension. The novel application of this direct path to ground in connection with the inventive arrangement will be described subsequently.

In connection with the normal operation of the marker, as described for example in the Williams patent, the marker Camp-on relay COA operates at the time the called station terminal is tested and found busy. Relay COA upon operating connects ground to the winding of Busy Line relay BY of the C.O. trunk circuit whereby to operate relay BY; this operate path is completed through a make contact of the Marker Connect relay of the trunk circuit, as relay MC1 of C.O. trunk circuit No. 1. (The Marker Connect relay of the trunk circuit is operated by a ground supplied from the marker at the time the particular trunk is selected by the marker.)

Relay BY, operated as above described, closes certain paths incidental to the camp-on function and partially completes at make contact BY–1 (FIG. 2) a path for subsequent application of the camp-on tone to the PBX line. At the time the attendant answers the call, for example from position circuit No. 1, the Attendant Connected relay of the C.O. trunk circuit operates, for example, Attendant Connected relay ACA1 of C.O. Trunk Circuit No. 1.

Since in the illustrative example we are now concerned with a normal opeartion, that is a connection to a nondata or voice line, the line will be connected directly to the normal station class-of-service terminal, as shown for example in the instances of lines No. 2 and No. 3. That is, the connection shown for line No. 1 from individual class terminal CS–1 through diode 11 to terminal 6 will not be provided in this instance.

Under the conditions now prevailing base 14 of transistor 17 is forward-biased by the voltage developed across the resistor TDR and the transistor is held in ON condition. Relay COT now operates from battery, winding of relay COT, closed path through transistor 17, make contact ACA1–1, break contact TD1–1, resistor 13 to ground. Relay COT, operated, closes at make contact COT–1 the path for application of the warning or alerting camp-on tone to the PBX line.

The operation of a typical busy verification auxiliary trunk circuit is fully described in Patent No. 3,327,065 of G. A. Michalopoulos and L. E. Thelemaque issued June 20, 1967. As described therein, after the auxiliary verification trunk has been activated from the position circuit, and assuming that the called line is in busy condition, operation of the marker connect relay of the involved trunk circuit, here assumed for illustrative purposes alone to be relay MC1 of C.O. trunk circuit No. 1, closes an operate circuit for the Busy Line relay, BYV of the auxiliary busy verification trunk. Relay BYV, operated, locks the ground through its make contact BYV–1 and closes at make contact BYV–2 a path for application of the alerting or warning tone to the PBX line. (This assumes released condition of relay TD2.) The transistor ON-OFF circuit provided in the auxiliary trunk circuit and which includes transistor 28 is so adjusted by the potential applied to base 41 through resistors 42 and 43 that the transistor switch is held in OFF condition by the potential developed across resistor TDR and applied over lead 44 to emitter 47; this is the condition prevailing when the busy line involved is a voice line. Accordingly Tone Denied relay TD2 does not operate and the path through make contact BYV–2 (FIG. 2) for application of the warning tone remains uninterrupted.

It will be apparent, therefore that for the general conditions prevailing in the instance of a busy voice line, that is when transistor switch 14 is biased by the potential across resistor TDR and is held ON, or when this potential is applied to emitter 47 whereby to hold transistor switch OFF, the application of the respective warning or alerting tone to the involved voice line is in nowise interferred with.

*Data line operation—prevention of tone*

As previously pointed out it is an important feature of the inventive arrangement that it is readily applied to the lines of an existing PBX which are selected for data service and effectively prevents application of the warning or alerting tones to such lines while, at the same time, effecting in no way the arrangement and operation of the voice lines nor the application of the warning or alerting tones thereto.

For purposes of further description of the inventive arrangement it will be asumed now that C.O. trunk circuit No. 1 has been connected to a PBX line for completion of an incoming call and that the line involved is a data line; in this event it is desirable as previously pointed out that application of the camp-on or other warning tone be prevented. It will be asumed that the data line involved is line No. 1 and it will be observed that this line, as representative of all the data lines, has been provided with three smiple diode paths not provided in the instance of the voice lines.

First, it will be noted that the connection of class-of-service terminal CS–1 of line No. 1 to the normal station class-of-service terminal 5 includes a blocking diode 7, second, that a connection through diode 11 has been provided from terminal CS–1 over line 12 to terminal 6 and, third, that a connection through diode 24 has been provided between class-of-service terminal CS–1 and terminal 8 of lead 9. These connections represent in the main the only modifications required for the application of the inventive arrangement to the data lines whereby to prevent the connection of the above-mentioned tones thereto.

It will be recalled from the described operations in connection wtih a voice line that relay BY operated, following operation of relay MC1, and that the path for applying camp-on tone was partially completed at make contact BY–1 (FIG. 2). The path was subsequently completed when relay COT operated over a path through transistor 17 held ON by the bias from resistance ground TDR. In the instance of line No. 1 (a data line) however, base 14 of transistor 17 is grounded, a path to direct ground being provided over line 12, diode 11, terminal CS–1, make contact TCS1–1 and the make contact of transfer pair SO–1. Transistor 17 is accordingly held in OFF condition and the operate path of relay COT is not closed. Relay COT does not operate and the camp-on tone is not applied to the PBX line as contact COT–1 (FIG. 2) remains open. Accordingly, in the instance of a busy data line, such as line No. 1 just described, application of the camp-on warning tone is effectively prevented.

In a typical PBX of the type in connection with which the present invention is particularly applicable upwards of 40 or more central office trunks may be used in completing calls to as many as 200 extensions. Three position circuits are ordinarily provided and any one, or all three, of the attendants may be directing central office trunks to stations or trunks at the same time. The marker processes only one connection at a time and uniquely identifies the station only at that time (at which time direct ground is present on the respective class-of-service terminal). It may well happen on occasion that all three attendants may be associated with three separate central office trunks at the same time in completing calls to respective stations, not all of which are data stations. For example, it will be assumed that the attendant associated with position circuit No. 1 is completing a connection to a data line (line No. 1) and that the other two attendants are completing connections to nondata lines. Obviously it is desirable to withhold the tone only from the data line and further it is obvious that positive means should be provided whereby to assure that the COT relay associated with the data line connection will not be permitted to operate after the marker connect relay has released and the connection to direct ground for holding the transistor switch in the OFF condition is no longer present. Accordingly, as contemplated by the present invention, means are included whereby the operate path of the COT relay of C.O. Trunk circuit No. 1 is opened in the involved position circuit during the association of the trunk circuit with a data line connection.

A transistor AND circuit is provided in each position circuit; these AND circuits are all of like configuration and in the instance of position circuit No. 1 the AND circuit includes transistors 21 and 22. A Tone Denied relay is associated with each AND circuit, relay TD1 being associated with the circuit of position circuit No. 1. Only the TD-relay of that position circuit which is involved in completing a connection to a data station line should operate. All three ACA-relays will be operated under the assumed condition but only MC1 of the MC-group of relays will be operated.

Now, as the marker identifies the data station line, the CS ground will be supplied through diode 24 and over lead 9 to all three position circuits and will also be supplied through make contact MC1 to C.O. trunk circuit No. 1; transistor 14 will be turned OFF as previously described. With transistor 14 OFF and with little or no voltage across emitter resistor 13, transistor 22 will be ON; transistor 21 will also be ON being forward biased by the CS ground. Accordingly, relay TD1 operates from ground, resistor 13, transistors 22 and 21, winding of relay TD1 to battery; relay TD1, upon operating, locks to ground through its make contact TD1–2 and break contacts RLS–1. Also, relay TD1, operated, interrupts at break contact TD1–1 the operate path of relay COT whereby to assure that relay COT will not operate after the CS ground has been removed.

It will be clear from the above that the TD-relay of a position circuit can operate only when the transistor corresponding to transistor 21 of the AND circuit is turned ON by the marker connecting to a data line and when, at the same time, the transistor corresponding to transistor 14 of a C.O. trunk circuit is held OFF by the direct ground connection. In the instance of position circuits involved in connections to nondata lines, therefore, the respective TD-relay does not operate and the tone is applied in the normal manner.

It will be understood that additional data lines may be connected to terminal 6 through additional diode paths, as through diodes 11′ and 11″, and to terminal 8 through additional diode lines, as through diodes 24′ and 24″.

In the event the busy verification auxiliary trunk circuit is connected to a data line it is desirable, of course, that application of the warning tone to the line be prevented. It will be recalled that, as described above, the tone is applied to a voice line when the BYV relay operates; the tone is applied to the PBX line through make contact BYV–2 (FIG. 2), the path also including break contact TD2–2 of the nonoperated Tone Denied relay TD2. (In the instance of a connection to a voice line and consequent connection of resistance ground to emitter 47 of transistor 28, the transistor ON–OFF switch is held in OFF condition and relay TD2 does not operate.)

In the instance of the connection to line No. 1, a data line, direct ground is connected from class-of-service terminal CS–1 over line 44 to the emitter 47 of transistor 28 causing the transistor switch to be turned ON whereby to close an operate path for relay TD2 from ground, resistor 27, make contact BYV–1, transistor 28, winding of relay TD2 to battery; relay TD2 operates and locks to ground through its make contact TD2–1. Relay TD2, operated, interrupts at break contact TD2–2 (FIG. 2) the path for applying the busy verification warning to the PBX line and the application of the tone is prevented as is desirable in the case of data lines.

While the busy verification auxiliary trunk circuit has been illustrated as associated with C.O. trunk circuit No. 1, being controlled by Marker Connect relay MC1, it may, of course, be associated in a generally similar manner with any of the other central office trunks.

An arrangement generally similar to that just described may be used in conjunction with the executive camp-on and ringback service referred to above.

It will be apparent from the above description that the unique arrangement provided accomplishes in a simple manner the overall desired objective of preventing the application of certain warning or alterting tones to those PBX lines which have been assigned to data service while, at the same time, affecting in no way the normal application of the tones to nondata lines. Also it will be apparent that, since normal operations of the basic circuits of the PBX are largely utilized, the novel arrangements of the invention can be incorporated in existent PBX installations without undue problems of cost, space or circuit redesign. It will be noted that comparatively little additional equipment is required for provision of the described features.

It is to be understood that the above-described arrangements are illustrative of the application of the principles of the invention. Numerous other arrangements may be devised by those skilled in the art without departing from the spirit and scope of the invention.

What is claimed is:

1. A telephone switching system comprising a plurality of lines, certain of said lines being data lines and other of said lines being voice lines, means assigning a class of service to each of said lines, means for applying an alerting tone to said lines on establishment of special connections for said lines, and means for preventing application of said alerting tone to said data lines, said tone applying means including transistor switch means responsive to a resistance ground and said preventing means including said class-of-service means and diode means for applying a direct ground control to said transistor switch means.

2. A telephone switching system in accordance with claim 1 further comprising additional means for inhibiting operation of said transistor switch means, said additional means including AND logic means responsive to said transistor switch means and to said class-of-service means.

3. In a telephone system including a private branch exchange, a plurality of lines at said private branch exchange, a certain of said lines being data lines and others of said lines being voice lines, means assigning a class of service to each of said lines, and means for establishing special connections to said lines when in busy condition, an individual class-of-service terminal for each of said lines, means for transmitting an alerting tone to the busy lines when said special connections are established thereto, and means including a connection to the class-of-service terminal of the respective line for preventing transmission of said alerting tone to a busy data line.

4. In a telephone system the combination defined by claim 3 further characterized in that said last-mentioned connection includes a diode and a connection to direct ground through the respective class-of-service terminal.

5. In a telephone system the combination defined by claim 4 further characterized in that said transmitting means includes a relay and that said preventing means also includes a transistor OFF-ON switch connected in the operate path of said relay.

6. In a telephone system the combination defined by claim 5 further characterized in a second means for preventing transmission of said alerting tone to a busy data line, said second means including a second connection to the class-of-service terminal of the respective line.

7. In a telephone system the combination defined by claim 6 further characterized in that said second preventing means includes a second relay, a break contact of said second relay included in said operate path of said first-mentioned relay, and means for controlling the operation of said second relay.

8. In a telephone system the combination defined by claim 7 further characterized in that said last-mentioned controlling means includes a transistor AND circuit comprising two transistors and means for biasing one of said transistors by direct ground through said second connection to the class-of-service terminal of the respective line.

9. In a telephone system including a private branch exchange, a plurality of lines at said private branch exchange, selected ones of which lines are assigned a data class of service, and means for camping on one of said lines when in busy condition, a class-of-service terminal for each line, a connection to direct ground from each of said terminals, an attendant's position circuit at the private branch exchange, means initiated through said position circuit for transmitting a camp-on indicating tone to the busy line, and means for preventing application of said tone to any of said lines which are assigned a data class of service.

10. In a telephone system the combination defined by claim 9 further characterized in that said transmitting means includes a relay, a transistor OFF-ON switch connected in the operate path of said relay, means effective when the busy lines is a nondata line for biasing said switch whereby to hold the switch in OFF condition, and means effective when the busy line is a data class line for shunting the biasing potential to direct ground whereby to change the switch to ON condition and close said operate path of said relay.

11. In a telephone system the combination defined by claim 10 further characterized in that said shunting means includes a connection through a diode to the class-of-service terminal of the respective line.

References Cited

UNITED STATES PATENTS

| | | |
|---|---|---|
| 3,327,065 | 6/1967 | Michalopoulos et al. |
| 3,344,235 | 9/1967 | Green et al. |
| 3,355,555 | 11/1967 | Thelemaque. |

WILLIAM C. COOPER, *Primary Examiner.*

ALBIN H. GESS, *Assistant Examiner.*